United States Patent [19]

Yamauchi et al.

[11] Patent Number: 5,162,962
[45] Date of Patent: Nov. 10, 1992

[54] MAGNETIC RECORDING APPARATUS HAVING REDUCED FRICTION SLIDING PARTS

[75] Inventors: Michihide Yamauchi; Nobunori Ooji, both of Utsunomiya; Atsushi Ishikawa, Hagagun; Masanobu Wakasa, Wakayama, all of Japan

[73] Assignee: Kao Corporation, Tokyo, Japan

[21] Appl. No.: 536,543

[22] PCT Filed: Nov. 11, 1988

[86] PCT No.: PCT/JP88/01140
§ 371 Date: Aug. 24, 1990
§ 102(e) Date: Aug. 24, 1990

[87] PCT Pub. No.: WO90/05363
PCT Pub. Date: May 17, 1990

[51] Int. Cl.$^5$ .................. G11B 17/34; G11B 15/60
[52] U.S. Cl. ............................ 360/130.34; 360/130.3
[58] Field of Search ............ 360/130.34, 130.3, 130.31, 360/130.32, 130.33

[56] References Cited

U.S. PATENT DOCUMENTS

| | | | |
|---|---|---|---|
| 4,833,556 | 5/1989 | Kosarko et al. | 360/130.34 X |
| 4,858,043 | 8/1989 | Kadokura et al. | 360/99.01 |
| 5,003,423 | 3/1991 | Imamura et al. | 360/130.3 X |

FOREIGN PATENT DOCUMENTS 64-49124  2/1989  Japan ........................ 360/130.34

*Primary Examiner*—John H. Wolff
*Attorney, Agent, or Firm*—Cushman, Darby & Cushman

[57] ABSTRACT

This invention relates to a magnetic recording apparatus which includes a magnetic head and device for moving a magnetic recording medium with respect to the magnetic head and makes recording to and reproduction from the magnetic recording medium, comprising a sliding member which comes into sliding contact with a magnetic recording medium made of a composite material containing glass-like carbon and at least one inorganic compound selected from the group consisting of metal oxides, metal nitrides, metal carbides and metal borides so that the sliding characteristics with respect to the medium can be improved and the recording/reproduction characteristics can be kept stable for a long period of time without damaging the medium due to reduced frictional resistance.

3 Claims, 2 Drawing Sheets

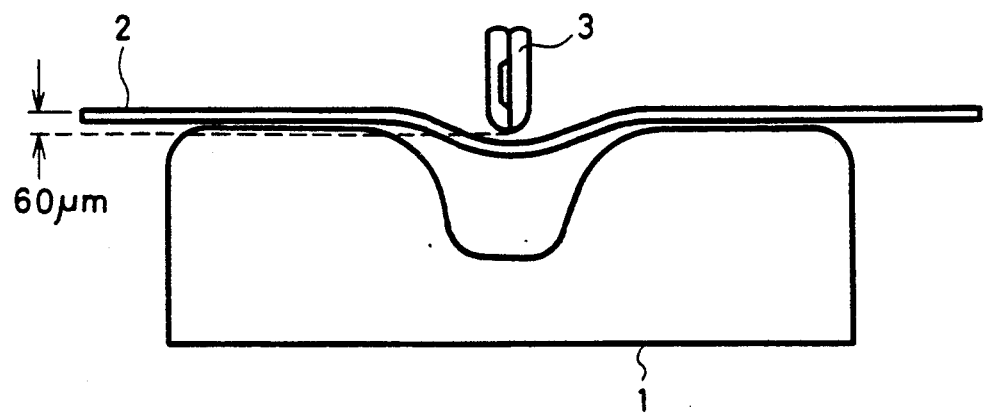
F I G. 1
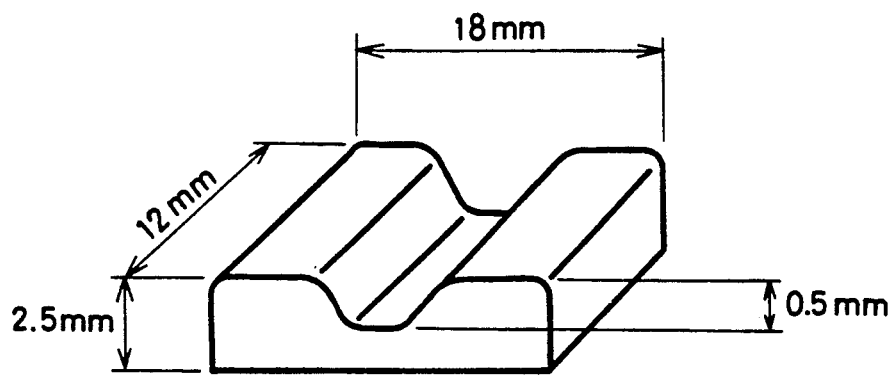
F I G. 2

MAGNETIC RECORDING APPARATUS HAVING REDUCED FRICTION SLIDING PARTS

This invention relates to a recording device for information processing, and more particularly to a magnetic disk drive having parts sliding over a recording medium for data recording and/or reproducing. This invention specifically relates to a magnetic disk drive having parts which either constantly or temporarily slide over and contact with a recording medium in the form of a tape, a disk or a sheet.

BACKGROUND AND RELATED ART

Various magnetic disks are available in the market currently for recording and/or reproducing data by means of a flexible disk, a hard disk or a magnetic tape with a magnetic layer coated on the surface thereof or formed as a thin film thereon. Efforts are being made for further development of the device.

These recorder/reproducers include a number of sliding parts which constantly or temporarily slide over and contact with the recording medium. Taking a few examples, there are a magnetic head, a stabilizer for head sliders, and a liner for jacket for flexible disks, a magnetic head, a head slider, guide pins, guide rollers, cylinders, a friction sheet in a cassette for magnetic tapes, and a flying head slider for a hard disk. These sliding parts must be durable, and should not inflict damages on the recording media when they slide over them.

Since there is a necessity to keep a delicate spacing (interval) from the recording medium at the time of recording/reproducing, these magnetic heads and sliders need due care in manufacture, and the material and shape thereof need to be carefully selected. The materials developed for the head slider in the prior art are calcium titanate, barium titanate, hard glass, alumina ceramics, carbon ceramics, etc.

Responding to the recent demand for higher densification in devices, flexible magnetic disks have increased in recording density and minimized in size. Various efforts were made for smaller size and larger capacity in the disks; forming the magnetic layer with thin metal films, increasing the number of revolution of the disk from 300 rpm to 4000 rpm, introducing a servo system for increasing precisions in tracking as observed in hard disks, or decreasing the thickness of a magnetic layer.

In the case of magnetic tapes, digital recording or recording at higher density has been increasingly preferred. Against that background, the defects caused by deviation in running or problems related to sliding have received much attention recently.

Flexible magnetic disks are defective in that the spacing (interval) between a magnetic head and a medium is not stabilized enough to cope with the trend of higher density and higher speed, and an improvement is required. There has been proposed as a solution a method to press the medium from the rear surface, but the method is defective in respect of materials; the materials are not quite wear resistant for use with a novel metal medium or too wear resistant and damages the medium.

Magnetic tapes are defective in respect of the material of guide pins which secure the stable running of the tapes without deviation. The material is required to have a slidability.

The materials should meet stringent requirements in relation to winding and running of tapes in a cassette and should not damage the medium on one hand, and should not be easily damaged by the medium on the other hand.

For hard disk devices, a new system is sought which optimally contacts a magnetic head with a recording medium in order to cope with harsher demands for smaller-size and higher-density systems as well as for a lower flying head.

OBJECT OF THE INVENTION

This invention was contrived to solve these problems in the prior art and aims at providing a system which is stable and durable in the operation of magnetic tape or magnetic disk drives.

SUMMARY OF THE INVENTION

This invention relates to a magnetic disk drive including a magnetic head and a means to move a magnetic recording medium in relation to the magnetic head which is characterized in that the drive further includes sliding parts which slide over and contact with the moving recording medium, and at least the contacting surfaces of either all or part of said sliding parts are structured with a composite material made of glass-like carbon and one or more inorganic compounds selected from among fine particles of metal oxide, metal nitride, metal carbide or metal boride.

The magnetic medium may be a magnetic disk, a magnetic tape or a magnetic sheet.

This invention relates to a magnetic disk drive having a means to rotate a flexible magnetic disk and a magnetic head which moves proximal to the surface of the disk, the magnetic disk is characterized in that the magnetic medium is a magnetic disk, the drive includes sliding parts which abut on the rear surface of said magnetic disk at a location the magnetic head comes close to, and the sliding parts or at least the parts abutting on the disk are structured with a material mainly made of glass-like carbon.

The glass-like carbon material used in the present invention may be a glass-like carbon material obtained by carbonizing a thermosetting resin; by carbonizing a resin which has been modified to be thermosetting by copolymerization or copolycondensation; by excessively hampering crystallization by a chemical treatment in the process of setting or carbonization; or by pyrolysing in gas phase such low molecular weight hydrocarbons as methane, ethylene, benzene. More specifically, the material may be a glass-like carbon of polyacylonitrile group, of rayon group, of pitch group, of lignin group, of phenolic resin group, of furan resin group, of alkyd resin group, of unsaturated polyester group, or of xylene resin group. The glass-like carbon mater is an armophous glass-like carbon material with an appropriate wear resistance which allows the material to wear before it inflicts damages on a recording medium surface film while the material is sliding over the medium.

However, the above mentioned glass-like carbon material sometimes poses problems if it is used singly in a high density recording system because of its wear resistance. Researches which have been made to solve the problems led to the present invention.

More particularly, this invention aims to provide a system having sliding parts with superior slidability in respect of a medium which are made of a composite material glass-like carbon and inorganic compounds. This invention improves the wear resistance of the composite material. The composite material may be one of glass-like inorganic compound selected from among fine particles of metal oxide, metal nitride, metal carbide or metal boride. Among these inorganic compounds, alumina, zirconia, silicone oxide, titanium oxide, silicone carbide, titanium carbide, silicone nitride, or zirconium boride.

The material may be obtained by dispersing and mixing an inorganic compound in the manufacture process of glass-like carbon or impregnating and mixing glass-like carbon or a precursor thereof in the sintering process of the inorganic compound. The method of impregnation is more preferable. The composite material may be formed as a thin film only on the sliding surface by a physical thin film forming method.

The magnetic medium device having contacting parts which constantly or temporarily contact or slide over in relation to a recording medium as mentioned herein includes not only the devices which reads or writes on a medium such as a disk drive or a tape drive but also peripheral systems such as a case for housing a magnetic recording medium. The sliding parts as mentioned herein denote a head or a head slider in a magnetic disk, or a read/write device such as a bulk head or a thin film head irrespective of the shape thereof.

The stabilizer plate as mentioned herein means what is generally referred to as a stabilizer, a pad or a control plate which maintains a relative and stable interval spacing between a medium and a head. It may be a liner in a jacket. In the case of a magnetic tape device, the stabilizer means a head or a head slider, a cylinder supporting the head, guide pins which regulate the running course of the tape, guide rollers, friction sheets or guide pins which control the winding characteristics or the running characteristics of a tape within a cassette. Floating heads or head sliders in a hard disk may be included in this category. Further, it may include all the parts which may directly slide over or contact with a recording medium either temporarily or constantly or a portion thereof such as the part of a multitrack head base which directly contacts a medium.

By employing parts made of such a material at locations contacting slidably with the magnetic medium, this invention enhances slidability and realizes excellent and stable recording/reproducing characteristics over a long period of time with less friction resistance.

BRIEF DESCRIPTION OF THE DRAWINGS

FIG. 1 is a view to show an example of a test conducted on an embodiment of this invention material.

FIG. 2 is a view to show a test piece of an embodiment of this invention.

EXAMPLES

Figure 3:
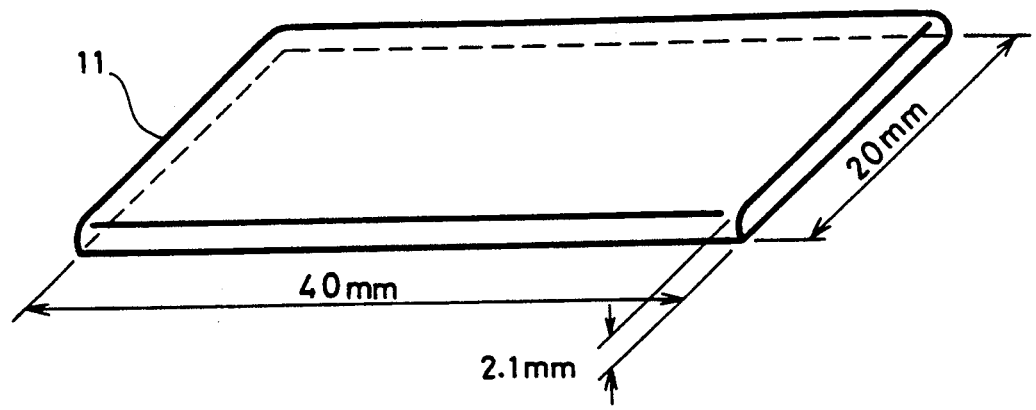
FIG. 3 is a perspective view to show a sliding part of an embodiment of the magnetic disk device according to this invention.

This invention will now be described referring to examples of the magnetic disk drives.

EXAMPLE 1

One hundred parts by weight of alumina of 0.3 $\mu$m mean particle size was added with a baking promotor of 0.05 part by weight of magnesium carbonate, 0.2 part by weight of sodium polyacrylate, and 30 parts by weight of water to obtain a slurry, and the resultant product was molded by casting into cubes of $50 \times 50 \times 10$ mm. After drying, the mold was pre-baked at 1300° C. for one hour in the air. Shrinkage and porosity after baking were respectively 7.8% and 33%.

The pre-baked material was impregnated with phenolic resin of 40% carbonization yield and 0.3% ash content while heating at 60° C. in vacuum, hardened at 90° C., and then baked in $N_2$ atmosphere at 1700° C. for 4 hours.

The obtained material had the bulk density of 3.57 g/cc and contained carbon at 4.8%.

EXAMPLE 2

One hundred parts of furfuryl alcohol (manufactured by Kao Quaker Co., Ltd.) was added with 5 parts of aqueous solution of 0.011 N-HCl, and the resultant solution was reacted at 96° C. for 6 hours and dehydrated under reduced pressure to obtain a thermoset resin. The thermoset resin was added with 2 weight % alumina superfine particles (Nippon Aerogel Co., Ltd.) of mean primary particle size of ca. 20 $\mu$m, and mixed dispersingly in a ball mill. Thus obtained 100 parts of furfuryl alcohol precondensate resin was added with 1.5 parts of aqueous solution of 70% p-toluenesulfonic acid, and the resultant solution was well stirred. The mixture was then poured into a rectangular container of 3 mm thickness and defoamed under reduced pressure, heated at 50°-60° C. for three hours and further heated at 90° C. for 5 days. Thus obtained composite hardened resin of a rectangular form was placed in a tube furnace, heated up to 1200° C. at the rate of 10° C./hr in a nitrogen stream, maintaining at the temperature for 2 hours, and cooled. The alumina content in the composite material was 4.1%.

Test Example 1

The composite materials obtained in Examples 1 and 2 were cut out in the shape of a twin body floating head slider for a head slider. The width of the ski parts was determined to be 0.420 mm and the length thereof 4.070 mm. The rear end of the ski part had the length of 0.340 mm and was tapered at 0.5°. The head width as a whole was 3.17 mm and the height thereof 0.87 mm. The pieces were fixed on a gimbal spring and mounted on a tester which is commercially available. Co-Ni hard disk medium which was coated with a protecting carbon film was subjected to CSS test (Contact Start and Stop Test) (a test which makes them contact at the times of start and stop, but raised and not contacted with air pressure while rotating).

The surfaces of the disk and the head were macroscopically as well as microscopically inspected after 20,000 times of CSS test. No flaws were observed on the sliding surfaces of the head and disk made of the materials of Examples 1 and 2. As a comparative example, the head made of ALTIC (composite ceramics of alumina and TiC) of the same shape was similarly tested, and some damages were observed on the surface of the disk to have been caused by the sliding of the head.

EXAMPLE 3

One hundred parts by weight of $Y_2O_3$ partially stabilized zirconia powder of 0.1 $\mu$m mean particle size were added with 0.2 part by weight of polyvinyl alcohol, 0.1 part by weight of stearic acid, and 100 parts by weight of water, and mixed to obtain spray dried powder. The powder was molded under the pressure of 1000 kg/cm$^2$ to be a sheet of 30×60×7 mm. The molded sheet was pre-baked at 1100° C. for one hour in the air. The obtained product had the shrinkage of 2.1% and the porosity of 56%.

The baked product was impregnated with furan resin of 30% carbolization yield, and 0.02% ash content at the atmospheric temperature in vacuum, hardened at 80° C. and baked at 1400° C. for four hours in vacuum.

The obtained product had the bulk density at 4.5 g/cc and contained carbon at 11.2%.

Test Example 2

The materials obtained in Examples 2 and 3 were processed to have the shape of 3.5" floppy disk heads which are commercially available. The product was mounted as a dummy head on a gimbal spring and attached on a 3.5" drive.

They were rotated slidably on the same track for 5 million times at 300 rpm. The floppy disk used was Co-γF$_3$O$_3$ coated one, but no damages or flaws were caused on both samples.

When a similar test was conducted on a calcium titanate material which has been shaped similarly to the above, some traces or damages caused by sliding were visually observed.

EXAMPLE 4

Five hundred parts of furfuryl alcohol and 420 parts of 92% paraformaldehyde were mixed and dissolved under stirring at 80° C., and a liquid mixture of 520 parts of phenol, 8.8 parts of sodium hydrate, and of 45 parts of water was added dropwise under stirring. After addition was completed, the mixture was reacted at 80° C. for 3 hours, further added dropwise with a mixture of 80 parts of phenol, 8.8 parts of sodium hydrate, and 45 parts of water, and reacted at 80° C. for 3.5 hours. The mixture was cooled to 30° C., neutralized with 70% p-toluenesulfonic acid, dehydrated under reduced pressure to remove 150 parts of water, and added with 500 parts of furfuryl alcohol. The obtained resin had the viscosity of 150 cps at 25° C. and the water content of 7%. One hundred parts of the resin was added with 2 parts of Al$_2$O$_3$ ultrafine particles of 0.01 μm particle size (Nippon Aerogel Co., Ltd.) and the obtained mixture was milled to be uniform in size. To 100 parts of Al$_2$O$_3$ composite resin thus obtained were added with 3.5 parts of a solution containing 70 parts of p-toluenesulfonic acid, 20 parts of water and 10 parts of glycol; the resultant solution was stirred well, defoamed under reduced pressure and injected into a container having 3 mm thickness. It was heated at 50°-60° C. for 3 hours and then at 80° C. for two days. Thus obtained hardened resin was placed in a tube furnace and heated up to 1200° C. at the rate of 10° C./hr in a nitrogen stream, maintained for 2 hours, and then cooled to obtain a-glass-like carbon composite material.

Test Example 3

From the materials obtained in Examples 3 and 4 were cut rods of 2×2×20 mm, and 2×2 mm end faces were machined by a precision lathe and a grinder to form spherical faces (R 20 mm). The rods were cut into pieces of 3 mm length. The head of a 2" flexible magnetic disk drive was replaced with thus obtained pieces and rotated slidably over a 2" metal particle coated medium (Sony, Inc.) with the head protruding by 60 μm and million times, no damages were visually observed on the flexible magnetic disk.

EXAMPLE 5

The composite material obtained in Example 4 was machined to a 2 mm thickness disk, attached on a cathode of a sputtering device with a metal bonding applied on a backing plate of oxygen free copper for sputtering. NiZn ferrite was shaped similarly to the sample in Example 3 and attached fixedly on an electrode for coating. The opposite electrode was sputter-etched in advance in cold water, applied with a thin alumina film by sputtering, and then with a carbon composite thin film of 400 Å. The sputtering device used was SPF 430 model (Nichiden Anelva), and the background pressure was adjusted to 10−7 Torr of vacuum similarly to an ordinary sputtering process. Argon gas was introduced up to 5×10$^{-3}$ Torr, and 400 W high frequency power was applied to conduct high frequency sputtering. A dummy spherical head formed with a thin composite material film was tested under the same conditions as in Test Example 3. After 10 million times, no damages was visually observed on the flexible magnetic disk.

EXAMPLE 6

Zirconia powder (mean particle size, 4 μm) and 1 weight % of phenolic resin which is a precursor of glass-like carbon were mixed and hardened, and then sintered at 1400° C.

EXAMPLE 7

One hundred parts of furfuryl alcohol was mixed with 0.2 part of p-toluenesulfonic acid, stirred and reacted at 90° C. to obtain a precondensate (viscosity of 650 cps at 20° C. when measured by B-type viscosimeter). After neutralization, the mixture was added with 2 vol % of superfine alumina particles (Nippon Aerogel Co., Ltd.; Aluminum Oxide C) stirred well in a sandmill, then added with 30% aqueous solution of p-toluenesulfonic acid, and hardened for two days at 80° C. The hardened composite material was cut into 3 mm thickness pieces, and heated up to 1600° C. at the rate of 10° C./hour. The pieces were thermally treated in Ar atmosphere at high temperature. The composite material contained 8.3 weight % of alumina.

EXAMPLE 8

Five hundred parts of furfuryl alcohol and 420 parts of 92% paraformaldehyde were stirred and dissolved at 80° C., and was added dropwise with a liquid mixture of 520 parts of phenol, 8.8 parts of sodium hydroxide, and 45 parts of water under stirring; the resultant solution was reacted at 80° C. for 3 hours. A liquid mixture containing 80 parts of phenol, 8.8 parts of sodium hydroxide, and 45 parts of water was further added dropwise and reacted at 80° C. for 7.5 hours. After cooling to 30° C., the mixture was neutralized with 70% p-toluenesulfonic acid, dehydrated to remove 200 parts of water under reduced pressure, and was added with 500 hundred parts of furfuryl alcohol. Thus obtained resin had the viscosity of 1500 cps at 25° C. and the water content of 7%. One hundred parts of tee resin was added with 5 parts of SiC powder (particle size, 0.06 μm; Hakusui Chemical Co., Ltd.), and 2 parts of polyethyleneglycol, and milled until a uniform size was obtained. One hundred parts of SiC composite resin was added with 3.5 parts of the solution containing 70 parts of p-toluenesulfonic acid, 20 parts of water, and 10 parts of glycol, stirred well, defoamed under reduced pressure and poured into molds of 3 mm thickness. The resin was heated at 50°–60° C. for 3 hours and at 80° C. for two days. Thus obtained hardened resin was placed in a tube furnace, and heated up to 1400° C. at the rate of 10° C./hr in a nitrogen stream, and maintained for 2 hours to obtain a glass-like carbon composite material. The material contained 10.5% SiC.

Test Example 5

The materials obtained in Examples 6, 7, and 8 were cut into the shape shown in FIG. 2. The durability test was conducted by mounting thus obtained sliding part on a pad 1 of a flexible magnetic disk device shown in FIG. 1, and setting 2" metal coated video floppy 2 (Sony Inc.) on the device. A magnetic head 3 protruding by 60 μm was revolved at the circumference speed of 7.54 mm (disk revolution rate, 3600 rpm; head position, R 20 mm). The magnetic head used was the one exclusively made for 2" video floppies. After the head had passed over the disk for 10 million times, no damages were visually observed and stable output characteristics were achieved. The contacted portion of the composite material was confirmed to have no substantially worn parts by microscopic examination, and the running stability was excellent. In order to facilitate understanding, the sagging of the floppy is slightly exaggerated in FIG. 1.

EXAMPLE 9

The composite material thin film of 400 Å was formed on an aluminum molded having the shape shown in FIG. 2 as the opposite electrode by the same method as used in the Example 5. The sample was mounted on a 2" flexible magnetic disk drive similarly to Test Example 5 and the durability test was conducted. After 10 million times of running, the disk was observed to have no damages and the output characteristics were stable. It was confirmed that the sliding/contacting portion of the piece was not worn.

Test Example 6

By a method similar to Example 8, a thin sheet of the composite material of 0.5 mm thickness was formed and finished to a mirror surface with #10,000 abrasive particles (alumina). In order to measure the friction coefficient of the material against the magnetic tape, the magnetic tape was fixed with an adhesive tape on a flat base while the material was fixed on a jig. The material was contacted surface-to-surface with the magnetic tape and pulled with Tensilon. The relative speed for the magnetic tape was 200 mm/min, and the friction coefficient was sought with the weight-tension ratio of the material.

The mold of the material was inserted between the inner walls of a cassette tape and a cassette so that the mold would slide over the magnetic tape edges in assembling the audio cassette. The winding torque was measured. The friction coefficient was 0.10–0.13 or less than 80% when used against a member prepared by fixing a commercial graphite filler with resin. The winding torque was 1.5–8.5 gcm or less than 70%. The characteristics of the material are such that the material is applicable not only to the sliding sheet within a cassette but also to guide pins or cylinders of a magnetic tape device.

An embodiment which is claimed in claim 2 of this invention's magnetic disk drive will now be described in detail referring to the drawings. The embodiment will be described herein solely to exemplify the present invention and will not limit in any way the technical scope of this invention.

Figure 4:
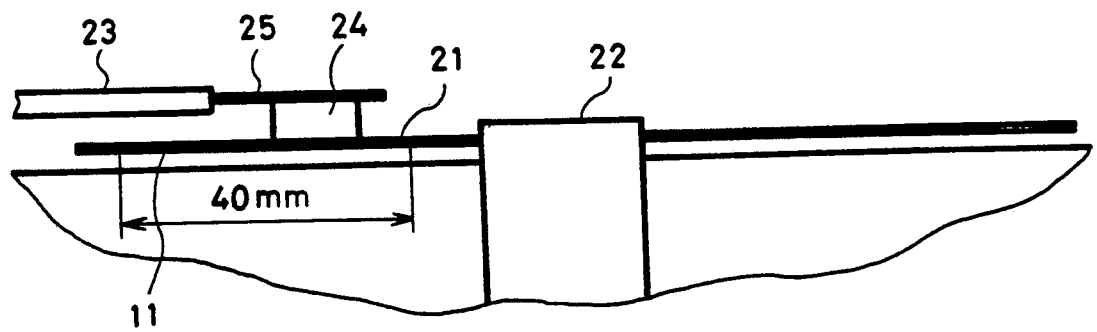
FIG. 4 is a structural view to show an embodiment of the magnetic disk device according to this invention wherein 1 ... a pad, 2, 24 ... flexible magnetic disks, 3, 23 ... magnetic heads, 11 ... a sliding part, 21 ... a head arm, 22 ... a gimbal spring for a head, 25 ... a spindle.

FIG. 3 is a perspective view to show a sliding member of an embodiment of the magnetic disk drive according to this invention, and FIG. 4 is a structural view thereof.

The embodiment of the magnetic disk drive comprises a spindle 22 for rotating a flexible magnetic disk 21, a head arm 23 which is provided on a means (not shown) proximal to the magnetic disk 21, and a head gimbal spring 25 fixed on the head arm 23, and provided with a magnetic head 24 proximal to the surface of the flexible magnetic disk 21. This invention is characterized in that it includes a sliding member 11 which contacts the disk 21 on the surface opposite to the location where the magnetic head 24 comes close thereto.

Embodiments of the sliding part 11 will now be described. They all are formed in the same shape as shown in FIG. 3 and tested on a device shown in FIG. 4.

EXAMPLE 10

Glass-like carbon (Grahard R by Kao) was cut out, ground by rough grinding, and chamfered to have R and C surfaces as shown in FIG. 3. Output characteristics of the flexible magnetic disk drive employing the above mentioned sample were measured to examine durability against a 5.25" magnetic disk coated with a magnetic powder of $\gamma\text{-Fe}_2\text{O}_3$ group as well as running stability between the magnetic disk and the magnetic head. The information in intermittent pulse patterns was recorded on one of the tracks of the magnetic disk 21, and the information was compared to the pulse patterns which were repeatedly read and recorded. After rotation of 140,000 times, not even a single error was detected. The result of torque measurement showed that it had a stable lubrication property for a long time.

EXAMPLE 11

One hundred parts of furfuryl alcohol was mixed with 0.2 part of p-toluenesulfonic acid, stirred at 90° C., and reacted to obtain a precondensate (viscosity of 650 cps at 20° C. measured by B-type viscosimeter). After neutralization, 2 vol % of superfine alumina particles (Aluminum Oxide C by Nippon Aerogel Co., Ltd.) was added and the mixture was stirred well in a sand mill, added with 30% aqueous solution of p-toluenesulfonic acid and hardened at 80° C. for two days. The hardened composite material was cut out in 3 mm thickness, heated up to 1600° C. at the rate of 10° C. per hour, and thermally treated in an Argon atmosphere at a high temperature. The material was cut out in the form shown in FIG. 3 and was used as a sliding member 11.

EXAMPLE 12

Grahard R (by Kao) was crushed in a jet mill to obtain fine particles of glass-like carbon (mean particle size 20 μm). The particles were compressed and thermally molded with phenolic resin (Novolak and Hexamin by Sumitomo Bakelite) and cut out in the form shown in FIG. 3.

EXAMPLE 13

Zirconia powder (mean particle size, 4 μm) was mixed with 1 weight % phenolic resin which is a precursor of glass-like carbon, hardened, and then baked at 1400° C. The material was cut into shapes shown in FIG. 3.

Tests similar to the one shown in FIG. 4 were conducted on the sliding parts obtained in Examples 11 through 13, and the similar low torque of stable output was realized. When tested with a metal medium such as a CoCr disk and operated at the speed of 1500 rpm, similar stable operation was realized.

Industrial Utility of the Invention

As described in the foregoing statement, this invention can enhance durability of the device and stabilize the operation thereof. This invention's device can further maintain the spacing interval between a flexible magnetic medium which records information on one surface and a magnetic head. In the case where the magnetic head is supported by a spring, this invention device can still stabilize the contact pressure between the magnetic medium and the magnetic head. The device does not inflict damages on the flexible magnetic medium which records information on both surfaces. As a protecting lubricating layer can be applied on the flexible magnetic medium, it eliminates the necessity to apply a lubricating agent on sliding parts. The device is also free of static electricity which otherwise would be generated by the conductivity of materials used, and hence, is free of dust collection on the recording medium or the parts which may come into contact therewith to thereby achieve excellent effects.

We claim:

1. A magnetic disk drive including a magnetic head and means to move a magnetic recording medium relative to the magnetic head, wherein said magnetic disk drive further includes sliding parts which slide over and contact with said moving magnetic recording medium, and that the contacting surface of at least one of said sliding parts is made of a composite material containing glass-like carbon and one or more of the inorganic compounds selected from among fine particles of alumina, metal nitride, metal carbide, and metal boride.

2. The magnetic disk drive as claimed in claim 1 wherein the magnetic medium is either a magnetic disk, a magnetic tape or a magnetic sheet.

3. A magnetic disk drive including a magnetic head and means to move a magnetic recording medium relative to the magnetic head, wherein said magnetic disk drive further includes sliding parts which slide over and contact with said moving magnetic recording medium, and that the contacting surface of at least one of said sliding parts is made of a composite material containing glass-like carbon and one or more of the inorganic compound selected from among fine particles of metal nitride, metal carbide, and metal boride.

* * * * *